US012673504B2

(12) United States Patent
Coelho Morais De Serpa Rosa et al.

(10) Patent No.: US 12,673,504 B2
(45) Date of Patent: Jul. 7, 2026

(54) MONITORING PRINTING FLUID

(71) Applicant: Hewlett-Packard Development Company, L.P., Spring, TX (US)

(72) Inventors: Cesar Luis Coelho Morais De Serpa Rosa, Sant Cugat del Valles (ES); Marc Clotet Marti, Sant Cugat del Valles (ES); Alberto Borrego Lebrato, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 440 days.

(21) Appl. No.: 18/247,178

(22) PCT Filed: Sep. 30, 2020

(86) PCT No.: PCT/US2020/053400

§ 371 (c)(1),
(2) Date: Mar. 29, 2023

(87) PCT Pub. No.: WO2022/071932

PCT Pub. Date: Apr. 7, 2022

(65) Prior Publication Data

US 2023/0364921 A1 Nov. 16, 2023

(51) Int. Cl.

*B41J 2/195* (2006.01)
*B41J 2/045* (2006.01)
*B41J 2/19* (2006.01)

(52) U.S. Cl.

CPC ............ *B41J 2/195* (2013.01); *B41J 2/0451* (2013.01); *B41J 2/19* (2013.01)

(58) Field of Classification Search

CPC ........ B41J 2/125; B41J 2/175; B41J 2/17566; B41J 2/195; B41J 2/0451; B41J 2/19; B41J 2/16579; B41J 29/393

See application file for complete search history.

(56) References Cited

U.S. PATENT DOCUMENTS

| | | | | |
|---|---|---|---|---|
| 7,656,530 | B2 | 2/2010 | Tatarczyk et al. | |
| 8,944,548 | B2 | 2/2015 | Chen et al. | |
| 2008/0316237 | A1 | 12/2008 | Jeon | |
| 2009/0184990 | A1 | 7/2009 | Shang et al. | |
| 2009/0185186 | A1 | 7/2009 | Shang et al. | |
| 2009/0190187 | A1 | 7/2009 | Cornell et al. | |
| 2011/0242158 | A1* | 10/2011 | Takata | B41J 2/175 347/92 |
| 2018/0183941 | A1 | 6/2018 | Houle et al. | |
| 2020/0254754 | A1 | 8/2020 | Netsu | |

FOREIGN PATENT DOCUMENTS

| | | | |
|---|---|---|---|
| RU | 2730876 | C1 * | 8/2020 |

* cited by examiner

*Primary Examiner* — Jannelle M Lebron
(74) *Attorney, Agent, or Firm* — Jordan IP Law, LLC

(57) ABSTRACT

The present disclosure refers to monitoring a printing fluid, in an example, a device is disclosed wherein the device N comprises a light emitter to illuminate a fluid line comprising a flowing printing fluid; an image sensor to capture a diagnostic image of the fluid line once it has been illuminated; and a processor connected to the detector being the processor to compare the diagnostic image to a baseline and to determine a printing fluid quality parameter based on the comparison.

15 Claims, 4 Drawing Sheets

MONITORING PRINTING FLUID

BACKGROUND

In some printing systems, a printhead receives a stream of printing fluid towards a printhead from a supply tank or container, such an arrangement is known as a fluid delivery sub-system or a fluid supply sub-system. In such a sub-system, printing fluid can be fed from a tank to the printhead using, e.g., a pump.

Inkjet printing systems are, in general terms, controllable fluid ejection devices that propel droplets of printing fluid from a nozzle within the printhead to form an image on a substrate wherein such propelling can be achieved by different technologies such as, e.g., thermal injection or piezo injection

DESCRIPTION OF DRAWINGS

The following detailed description will best be understood with reference to the drawings, wherein.

DESCRIPTION OF EXAMPLES

Figure 1:
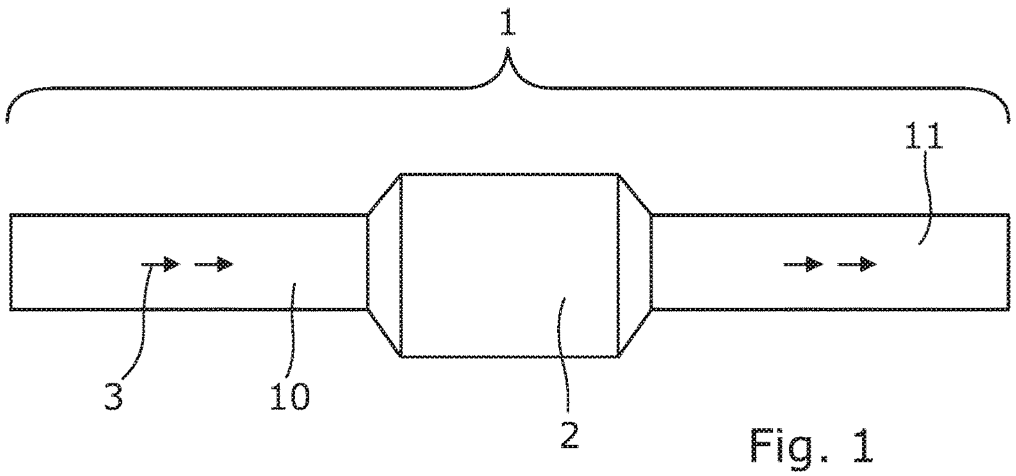
FIG. 1 shows a schematic diagram of a monitoring device according to an example.

In the foregoing, a printing fluid monitoring device is disclosed, the device comprising:

- a light emitter to illuminate a fluid line comprising a flowing printing fluid;
- an image sensor to capture a diagnostic image of the fluid line once it has been illuminated; and
- a processor connected to the detector being the processor to compare the diagnostic image to a baseline and to determine a printing fluid quality parameter based on the comparison.

In an example, the device comprises a housing to enclose the light emitter, the image sensor and the fluid line. Particularly, the housing may comprise a clamping mechanism as to clamp the housing over the fluid line thereby allowing for a monitoring of existing lines without having to cut the lines and incorporate the device in series with such a line. Alternatively, the housing may comprise a printing fluid inlet and printing fluid outlet to be connected to the fluid line of a printing system.

In a further example, the image sensor is to capture images at a frequency of at least 20 Hz and the processor is to determine printing fluid quality parameters based on the images in real-time. By real-time, it should be understood that the diagnostic image is processed within milliseconds so that it is available virtually immediately so that, e.g., a printing system may determine whether action is to be taken based on the processing.

Further, in an example, the baseline comprises a set of previously acquired images. For instance, the processor may comprise a machine learning engine and the set of images previously acquired are part of a training set for the machine learning engine. In another example, the processor may comprise a computer vision engine to determine printing fluid anomalies from the diagnostic image, in that cases, the hue or lightness of a baseline image, previous images of anomalies, and/or a library of anomalies could be considered a baseline.

In another example, the processor is to compare a color density across the diagnostic image and determine the print quality parameter based on the differences in the color density across the diagnostic image. Color density may include any color characteristic such as the hue or lightness of the diagnostic image.

Moreover, it is hereby disclosed a printing system, including

- a printing fluid delivery sub-system
- a light emitter to illuminate a fluid line associated to the fluid delivery sub-system, the fluid line comprising a printing fluid flowing therethrough;
- an image sensor to capture a diagnostic image including a portion of the fluid line and the printing fluid; and
- a processor to determine a printing fluid quality parameter based on performing an image processing operation on the diagnostic image.

In an example, the printing fluid quality parameter is based on the detection of bubbles, clogs or color variations in the diagnostic image.

Further, in some examples, the image processing operation comprises comparing the diagnostic image to a baseline in which the baseline could be, a previous image, a determined color baseline or a set of images (e.g., a training set for a machine learning engine or a library of anomalies for a computer vision engine).

13. Also, in a particular example, the light emitter is to illuminate a plurality of fluid lines with a plurality of printing fluids, the image sensor is to capture a diagnostic image including a portion of each of the plurality of fluid lines and their respective printing fluids and the processor is to determine a plurality of printing fluid quality parameters based on performing an image processing operation for each of the plurality of printing fluids.

A method for fluid monitoring is also disclosed, the method comprising issuing instructions to a processor or any other computing device to:

- illuminate, by a light source, a printing fluid conductor comprising printing fluid;
- acquire, by an image sensor, a diagnostic image of the previously illuminated printing fluid conductor; and
- determine, by a processor, a printing fluid quality parameter based on the diagnostic image;

wherein the printing fluid quality parameter is determined based on a comparison between the diagnostic image and a baseline accessible by the processor.

In an example, the method is performed at a frequency of above 20 Hz and processed in real-time In the following description and figures, some example implementations of print apparatus, print systems, and/or methods of printing are described. In examples described herein, a "printing system" may be a system to print content on a physical medium (e.g., paper, textiles, a layer of powder-based build material, etc.) with a print material (e.g., ink or toner). For example, the printing system may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A printing system may utilize suitable print consumables, such as ink, toner, fluids or powders, or other raw materials for printing. In some examples, the printing system may be a three-dimensional (3D) printer. An example of fluid print material or printing fluid is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

FIG. 1 shows a schematic diagram of a monitoring device according to an example. In the example described a printing fluid delivery system may comprises a fluid line 1 may be provided with a monitoring device 2 defining an upstream section 10 and a downstream section 11. In an example, the monitoring device may comprise clamping means over the fluid line as to be engageable thereto in different portions of the fluid line 1, thereby providing flexibility as to modify the portion of the line that is to be monitored.

A printing fluid may be an ink, such as a color ink, including CMYK inks, and white ink. The ink may be a latex ink or another type of ink. In other examples, the printing fluid can be a type of conditioning fluid used in inkjet type printers, including 2D and 3D printer such as overcoats, fixers, fusing agents, etc. The printer may be, may include, or may be part of a large format printer, for example.

The monitoring device 2 is to monitor a printing fluid quality parameter such as, e.g., a printing fluid anomaly such as bubbles in the printing fluid as it travels through the fluid line 1 or a sediment of printing fluid that may generate cogs and, eventually, be harmful on the integrity of the fluid delivery sub-system or the printheads. The monitoring approach described in more detail below relies on optic sensing, this optic sensing capability allows having very little or no interaction with the printing fluid thereby avoiding creating new printing fluid quality issues and being a more robust solution, e.g., in case of corrosive printing fluids that may damage sensors that are in contact with the printing fluid.

Figure 2:
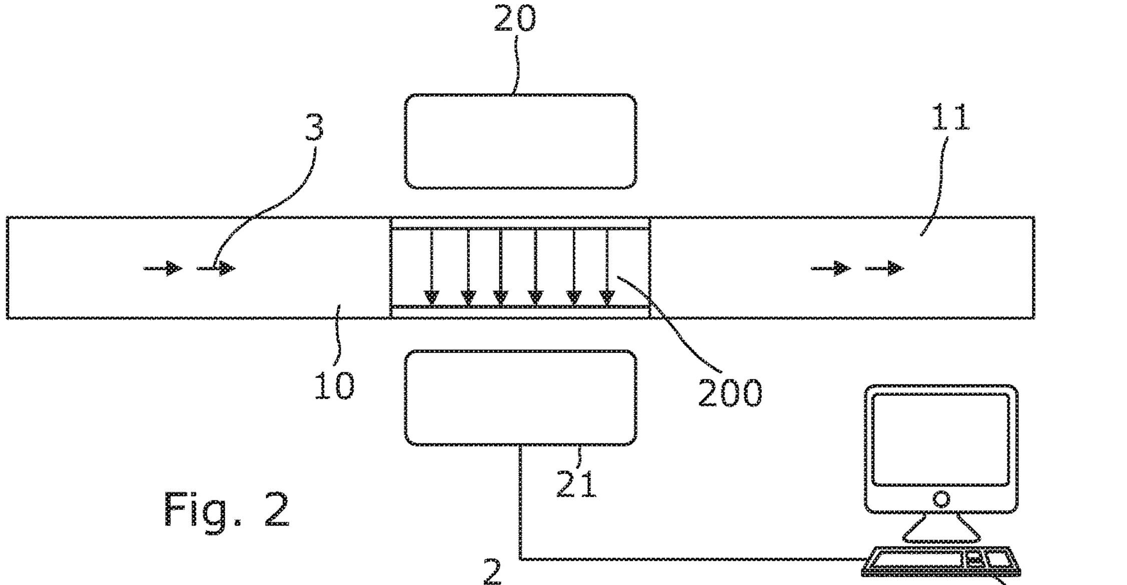
FIG. 2 shows a schematic cross-section of a monitoring device according to another example.

FIG. 2 shows a schematic cross-section of a fluid line 1 wherein a printing fluid 3 is flowing therethrough. A monitoring device 2 including a light emitter 20 and an image sensor 21 is positioned in opposing sides of the fluid line 1. The monitoring device 2 may provide real-time data of the printing fluid 3 that passes through the fluid line 1 thereby allowing for real-time decisions to be taken to ensure the integrity of the printing system and/or its print quality.

The monitoring device 1 uses the light emitter 20 to issue a light beam 200 as to illuminate part of the fluid line 1 comprising flowing printing fluid 3. Then, an image sensor 21 is used to capture the illuminated fluid line and printing fluid 3 in a diagnostic image. Such diagnostic image is analyzed using a processor 220 wherein such processor is to compare the diagnostic image with a baseline and determine a print quality parameter based on such comparison.

The processor 220 may be any combination of hardware and programming to implement the functionalities described herein. These combinations of hardware and programming may be implemented in a number of different ways. In certain implementations, the programming for the processor 220, and its component parts, may be in the form of processor executable instructions stored on at least one non-transitory machine-readable storage medium and the hardware for the engines may include at least one processing resource to execute those instructions. The processing resource may form part of the monitoring device 2 or be part of the printing system to which the monitoring device 2 is connected, or a computing device that is communicatively coupled to the printing system. In some implementations, the hardware may include electronic circuitry to at least partially implement the processor 220. For example, the processor 220 may comprise an application-specific integrated circuit that forms part of a printing device within the printing system.

In an example, the processor 220 may compare the diagnostic image acquired by the image sensor 21 with a baseline and identify possible artifacts in the printing fluid. In an example, a computer vision engine may be used to compare the diagnostic image with a baseline image and identify specific shapes that may be indicative of artifacts in the printing fluid such as, e.g., bubbles or sediments of printing fluid.

Additionally or instead of using a computer vision engine, the baseline may be a set of previously acquired images that are used as a training set for a machine learning engine and the processor is to feed the diagnostic image to the machine learning engine and obtain a print quality parameter from the machine learning engine, the machine learning engine may be, e.g., a neural network, a convoluted neural network, or deep learning.

Additionally or instead of machine learning or computer vision engine, the processor 220 may be to determine a color variation of the printing fluid in a diagnostic area. In particular, the processor may identify possible color variations that may be indicative of possible low image quality and/or the integrity of the printing system. In particular, an area of the diagnostic image showing a different color density may be indicative of artifacts that reduce the printing fluid 3 quality, for example, an area showing a lighter color density may be indicative of presence of bubbles or an area that has a significant density may be indicative of sediments or clogs in the printing fluid 3. In these cases, the processor 220 may determine a variation of color density in the diagnostic image and, if the variation is above a determined threshold level, the image quality parameter may be modified.

In any case, the processor 220 is to determine a printing fluid quality parameter based on the analysis of the diagnostic image and based on the printing fluid quality parameter determine whether an action is to be taken as to ensure image quality and/or integrity of the printing system. In an example, if the printing fluid quality parameter is below a threshold, the processor may, for example, stop the printing system and/or prompt the user that a maintenance operation is recommended in the printing fluid delivery sub-system associated to the fluid line 1 associated to the monitoring device 2.

Figure 3:
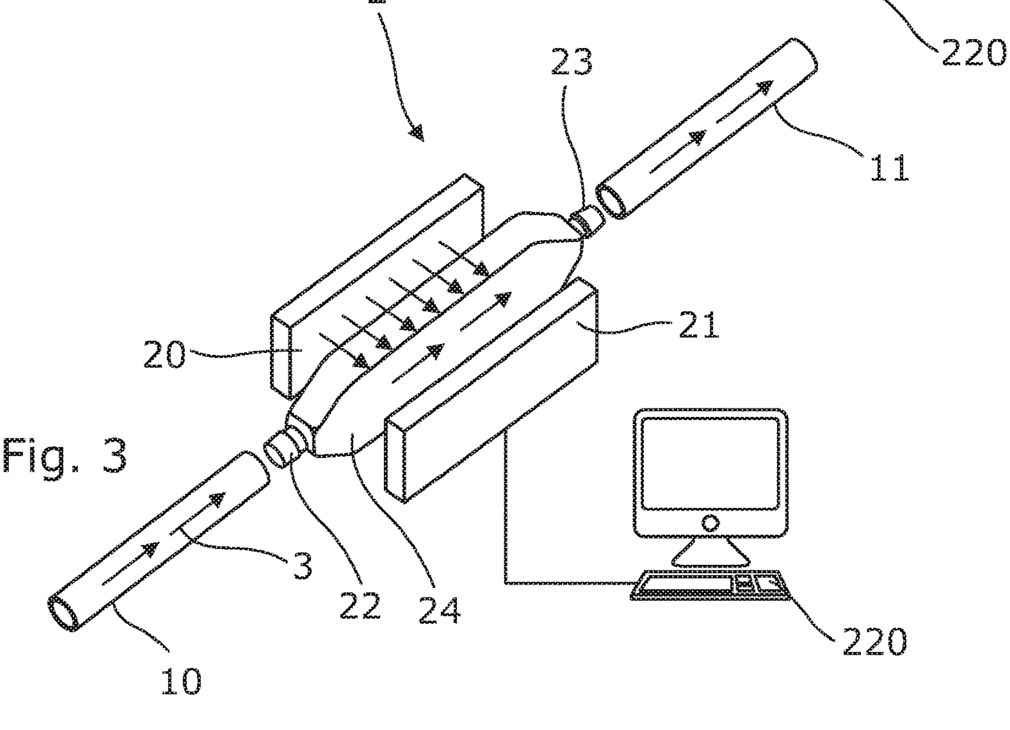
FIG. 3 shows an exploded view of a further example of a monitoring device for a fluid line.

FIG. 3 shows a further example of a monitoring device 2. In the example of FIG .2, the monitoring device 2, instead of having a clamping mechanism to enclose a fluid line 1, comprises a fluid input 22, a fluid output 23 and a fluid chamber 24 that are to be part of the fluid line 1 and allow the flow of printing fluid 3 therethrough. In an example, the monitoring device 2 may be connected to a determined part of the fluid line 1, e.g., replacing a connector with the monitoring device or a fluid line 1 may be cut and the monitoring device may be added as part of the fluid line 1.

The monitoring device 2 of FIG. 3 comprises a light emitter 20 and an image sensor 21 on opposite sides of the fluid line 1, in particular, on opposite sides of the fluid chamber 24. The upstream section 10 of the fluid line is connected to the fluid input 22 and the downstream section ii of the fluid line is connected to the fluid output 23 thereby forming a fluid line that allows the printing fluid to pass through the monitoring device. Similarly to the example of FIG. 2, the light emitter 2 is to illuminate the fluid line 1, in particular the fluid chamber 24 and the image sensor 21 is to collect an image one the fluid chamber 24 has been illuminated. In an example, the fluid chamber 24 is of transparent material as to allow the image sensor to capture with more accuracy the printing fluid 3 passing through the fluid chamber 24. This feature aids in improving the accuracy of the monitoring device 3 given that the chamber can be made of a determined material and such material may be pre-characterized as to filter possible effects associated to the fluid line 1 and focus the analysis on the printing fluid 3.

In an example, the fluid chamber 24 may have a particular shape that may improve the functioning of the monitoring device 2. In particular, the fluid chamber 24 may have a substantially hexahedron shape, in particular, a rectangular cuboid and, in an example, the light emitter 20 and the image sensor 21 are coupled to the faces with larger area of the rectangular cuboid. The use of such a shape allows having a thin film of printing fluid 3 to analyze which is easier to capture using image sensors and to analyze by image processing techniques.

Figure 4A:
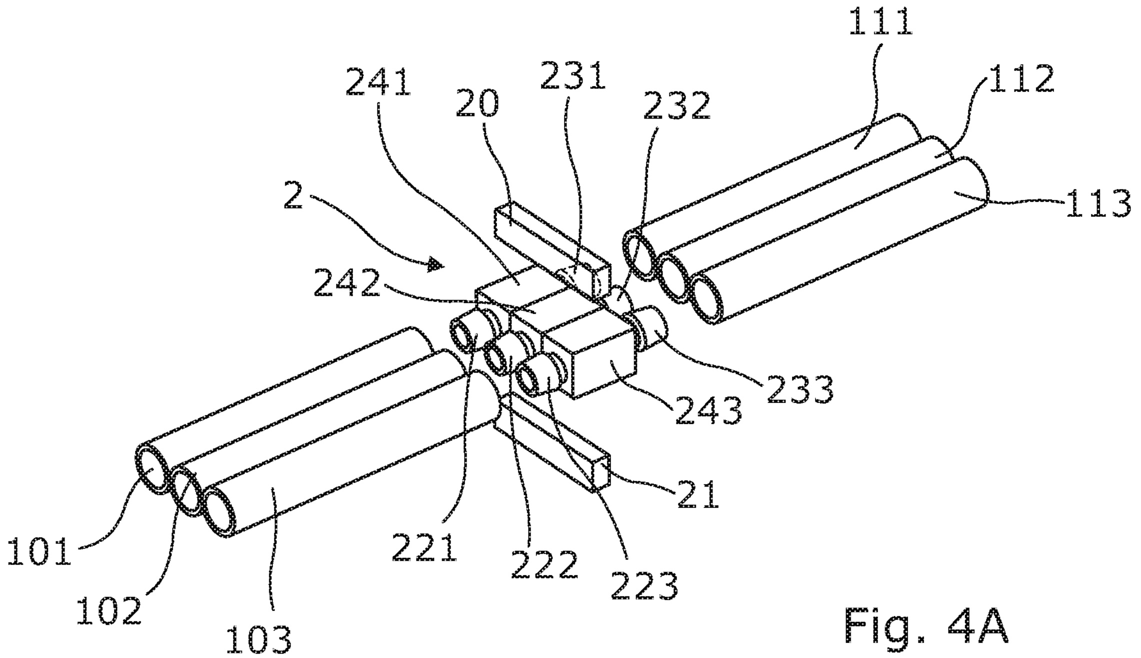
FIG. 4*a* shows an exploded view of an example of a monitoring device for a plurality of fluid lines.

FIG. 4A is an example of a fluid monitoring device 2 intended to monitor a plurality of fluid lines, in particular, the example of FIG. 4A a three-line monitoring device is depicted. In particular, the fluid monitoring device is to monitor: a first line having a first upstream portion 101 and a first downstream portion 111; a second line having a second upstream portion 102 and a second downstream portion 112; and a third line having a third upstream portion 103 and a third downstream portion 113. In an example, each of the lines is to receive a different printing fluid flow, e.g., each of the lines may convey a color ink such as CMYK inks or another printing fluid such as, optimizers, pre-conditioners or other non-marking fluids that may be substantially transparent.

The monitoring device 2 of FIG. 4A comprises a plurality of fluid chambers 241, 242, 243, corresponding to each of the printing fluids to be analyzed. The example of the monitoring device of FIG. 4A comprises a light source 20 to illuminate the plurality of fluid chambers 241, 242, 243 and the printing fluid flowing therethrough. Also, the monitoring device 2 comprises an image sensor 21 to acquire at least a diagnostic image associated to the plurality of fluid lines.

Even though the example of FIG. 4A refers to a monitoring device wherein the device is connected in series in the fluid line, similarly to the device of FIG. 3, a monitoring device for a plurality of fluid lines can be connected to the fluid lines by a clamping mechanism such as the one described with reference to FIGS. 1 and 2.

In an example, an image sensor 21 may be used to capture a single diagnostic image associated to the plurality of fluid lines. In such a case, the image sensor 21 would acquire a diagnostic image such as the one provided in FIG. 4B.

Figure 4B:
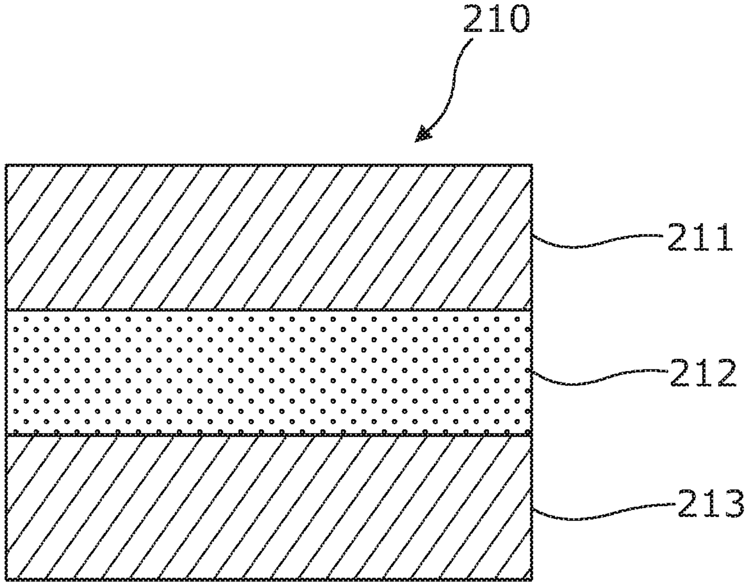
FIG. 4*b* shows a schematic example of a diagnostic image corresponding to a monitoring device for a plurality of fluid lines.

The diagnostic image 210 of FIG. 4B is an image acquired for a plurality of lines, each of them associated to a determined fluid. In the example of FIG. 4B each of the lines comprises a different fluid, therefore, the image acquired would comprise a first layer 211 associated to the first line, a second layer 212 associated to the second line and a third layer 213 associated to the third line.

In an example, the diagnostic image comprising the three layers 211, 212, 213 would then be processed by a processor wherein the images would be segmented, and each layer would be treated as an independent sub-image. Then, the processor would analyze each of the sub-images to determine a quality parameter for each of the printing fluids, i.e., a first printing fluid quality parameter associated to the first line, a second printing fluid quality parameter associated to the second line and a third printing fluid quality parameter associated to the third line.

In an example, each of the sub-images may be analyzed by a computer vision engine and/or a machine learning engine as to analyze the sub-images and provide printing fluid quality parameters for each of the lines. Alternatively, the diagnostic image may be fed directly to the processor and the processor would compare the diagnostic image with a baseline associated to the plurality of lines. More details on the analysis of the diagnostic images that are likewise applicable to each of the sub-images will be explained in more detail with reference to FIG. 5.

The monitoring device 2 explained with reference to FIGS. 1-4B may provide real-time or near-real-time monitoring of at least a fluid line associated, e.g., to a printing system. This real-time or near-real-time capability may be associated to the capability to regularly obtain images, e.g., at a frequency of over 20 Hz, preferably between 20 and 1000 Hz. Then, these images may be processed by the processor in about 1 to 50 ms, thereby providing increased capability for continuous monitoring of printing fluids as they flow through a fluid line and being able to detect low quality printing fluid, e.g., printing fluid having anomalies that may affect print quality and/or printing system integrity.

Further, the image sensor 21 may be any device capable of capturing an image with enough pixel density to be able to be analyzed by a processor, examples of image sensors may be a charged-coupled device (CCD), or, a spectrophotometer. Also, the light emitter 20 may be, for example, a uniform light emitter that illuminates in a substantially uniform manner the portion of the fluid line that is to be analyzed.

Figure 5:
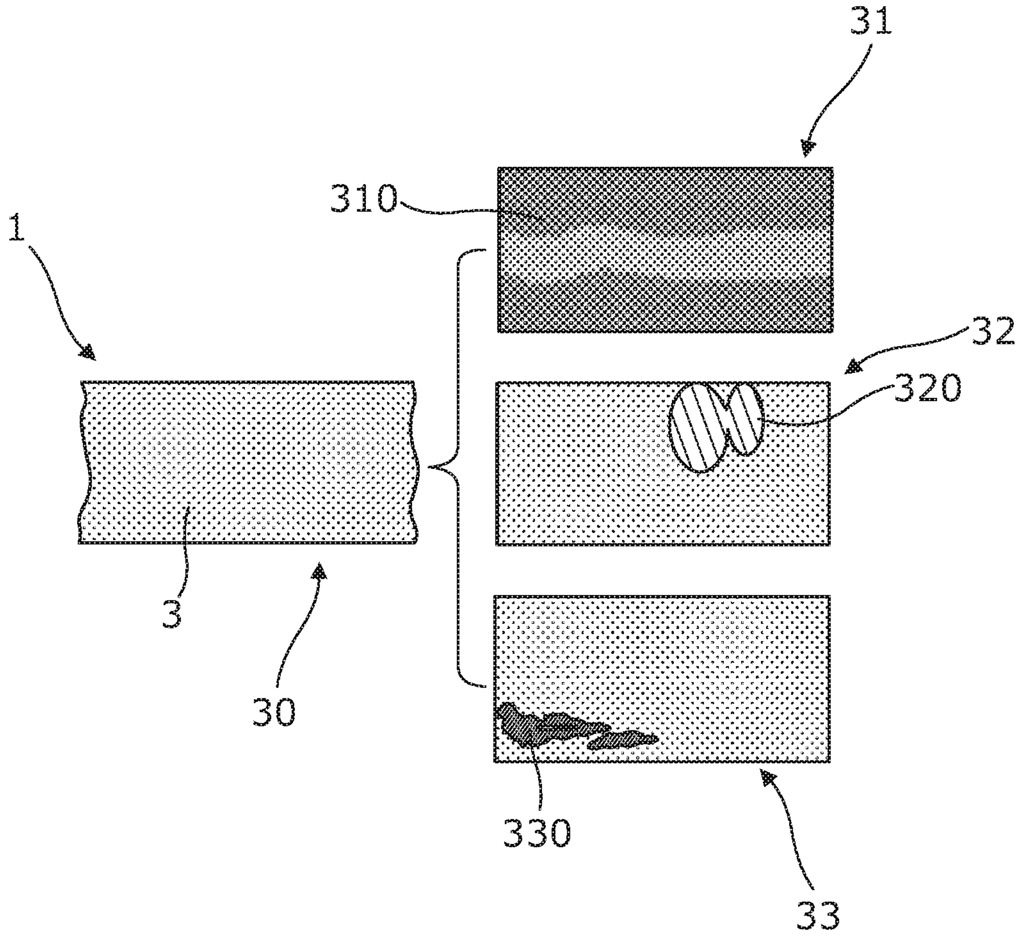
FIG. 5 shows a schematic representation of diagnostic images that may be collected and analyzed by a monitoring device according to an example.

FIG. 5 shows schematic examples of diagnostic images that may be acquired for a particular fluid line 1. In an example, printing fluid 3 may flow through the fluid line 1 and examples of print quality issues that may lead to determining a quality parameter that may lead to triggering a maintenance operation may include color variation of the printing fluid, presence of air bubbles in the printing fluid and/or printing fluid impurities, e.g., clogs, sludges, etc.

A first abnormal diagnostic image 31 represents a color variation across the analyzed area within the printing fluid. This color variation may be indicative of printing fluid impurities, or sedimentation of the printing fluid. In an example, the processor may analyze the image and, if the color variation is above a determine threshold issue a print quality parameter so that the printer may be stopped given that it may affect print quality.

A second abnormal diagnostic image 32 represents the presence of air bubbles 320 within the printing fluid. In an example, the processor may determine that the volume of the bubble is above a threshold and determine a print quality parameter that may stop the printing operation since it may affect the integrity of the printing system, e.g., damage the printheads.

A third abnormal diagnostic image 33 represents the presence of severe impurities 330 such as, e.g., printing fluid sludge. In an example, similarly to the case of air bubbles, the processor may determine the volume of the severe impurity 330 and, if the volume is above a determined threshold, issuing a print quality parameter that may stop the printing operation as it may affect the integrity of the printing system.

In an example, the determination of the print quality parameter may be performed by comparing the diagnostic image (e.g., the abnormal diagnostic images 31, 32, 33) with a baseline image 30 and, based on the comparison determine the likelihood of the images, and, if the likelihood is below a determined threshold level, determine that there is too much variation and maintenance operations is to be performed, therefore, the printer may launch a maintenance operation, e.g., purging the fluid lines or prompt the user that an abnormal condition may be occurring in the fluid line.

In a further example, the diagnostic image and the baseline image 30 may be fed to a computer vision engine wherein the computer vision engine may identify particular features, e.g., shapes of determined anomalies such as bubbles and, more accurately identify the specific problem that was identified by the fluid monitoring device and trigger a maintenance operation or prompt a user accordingly. The baseline image may also be a plurality of images and some of the baseline images may include abnormalities so that the computer vision engine may identify a possible anomaly in a diagnostic image.

In a further example, the baseline image may be a set of images that are used to train a machine learning engine. Then, the monitoring device may capture a diagnostic image, feed it to the machine learning engine and the machine learning engine may determine a print quality parameter that may trigger a maintenance operation, a prompt the user or other actions in the printing system. Additionally, since the baseline images may include classified images with certain abnormalities, the machine learning engine may determine the presence of an anomaly and identify which type of anomaly may be present.

Figure 6:
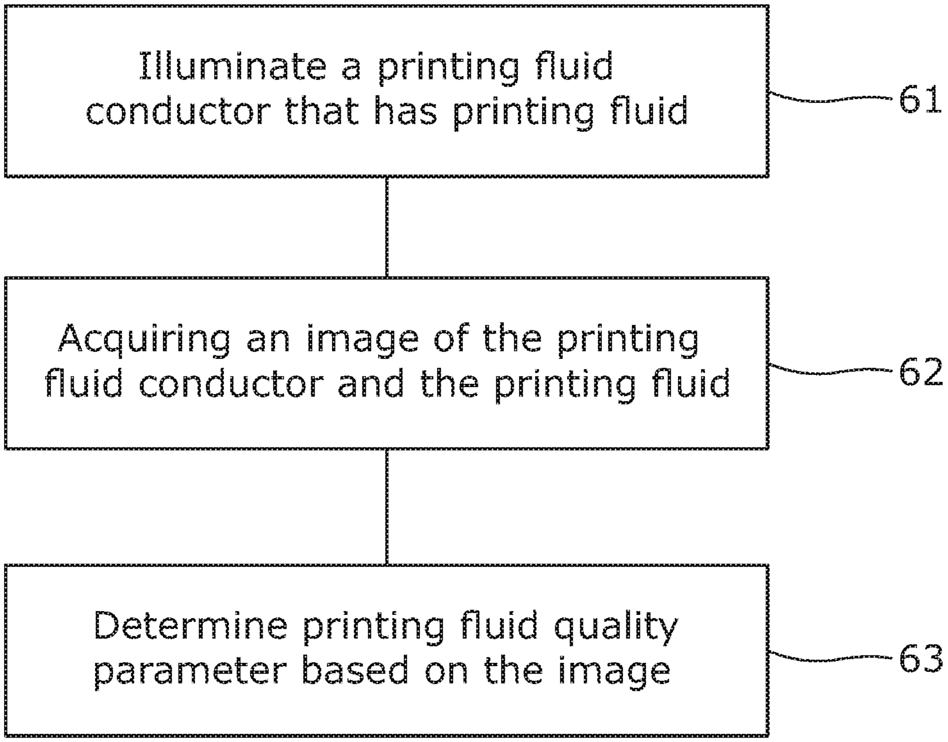
FIG. 6 shows a flowchart of a method for monitoring a printing fluid according to an example.

FIG. 6 shows an example of a method to perform a fluid monitoring, e.g., for a printing system. In the example of FIG. 6 a processor is configured to illuminate a printing fluid conductor that has printing fluid 61. In an example, the monitoring device is an in-line monitoring device wherein an analysis is performed while printing fluid is flowing through the printing fluid conductor or fluid line. For example, the processor may be to instruct a light emitter to illuminate a conductor that may be a fluid line, e.g., a chamber of a monitoring device that is part of the fluid line.

The processor may be configured to, once the printing fluid has been illuminated, acquiring an image of the printing fluid conductor and the printing fluid 62. The acquired image is to be used as a diagnostic image. As mentioned above, the diagnostic image may be an image acquired by a CCD camera or, in a more accurate sensor, using a spectrophotometer.

Finally, the processor may determine a printing fluid quality parameter based on the diagnostic image 63. As disclosed herein, the processor may comprise image processing engines to aid in the determination of the printing fluid quality parameter.

Examples of image processing engines may include one or more of: a machine learning engine, or a computer vision engine.

In an example, the processor may be to compare the diagnostic image with a baseline, e.g., a baseline image or a baseline color. In this case, the printing fluid quality parameter may be a comparison between the diagnostic image and the baseline as to determine, e.g., variations on the color of the printing fluid in determined areas and, based on the color variation and the area experimenting such color variation determine a printing fluid quality parameter, i.e., if the color variation and/or the area with the variation is above a determined threshold determine a printing fluid quality parameter that triggers a maintenance operation, stops a printing operation of prompts the user that the print quality parameter may affect the quality of a print or may affect the integrity of the printing system.

Also, the processor may be equipped with a computer vision engine that, in addition or instead of the previously disclosed comparison, may determine the presence of artifacts in the diagnostic image, e.g., based on an artifact library that is part of the baseline. In an example, the computer vision engine may be able to determine whether the artifact is a bubble, an ink sludge, printing fluid sedimentation, etc.

Further, the processor may be equipped with a machine learning engine wherein the machine learning engine comprises, a part of the baseline, a training set built based on a plurality of images. The machine learning engine may use the diagnostic image as input and output a printing fluid quality parameter based on the diagnostic image. In an example, if the printing fluid quality parameter is below a determined threshold, the printing system may take action to avoid print quality issues or printer integrity problems such as, e.g., stopping a printing operation, purging a fluid line, prompting the user that the printing fluid may have a quality defect, etc.

The invention claimed is:

1. A printing fluid monitoring device comprising:

a light emitter to pass light through a fluid line comprising a flowing printing fluid;

an image sensor to capture a diagnostic image of the flowing printing fluid in the fluid line once the light has passed through the fluid line; and a processor connected to the image sensor to compare the diagnostic image to a baseline and to determine a presence of printing fluid sludge based on the comparison.

2. The device of claim 1 further comprising a housing to enclose the light emitter, the image sensor and the fluid line.

3. The device of claim 2 wherein the housing comprises a clamping mechanism as to clamp the housing over the fluid line.

4. The device of claim 2 wherein the housing comprises a printing fluid inlet and a printing fluid outlet to be connected to the fluid line of a printing system.

5. The device of claim 1 wherein the image sensor is to capture images at a frequency of at least 20 Hz and the processor is to determine the presence of printing fluid sludge based on the images in real-time.

6. The device of claim 1 wherein the baseline comprises a set of previously acquired images.

7. The device of claim 6 wherein the processor comprises a machine learning engine and the set of images previously acquired are part of a training set for the machine learning engine.

8. The method of claim 6 wherein the method is performed at a frequency of above 20 Hz and processed in real-time.

9. The device of claim 1 wherein the processor comprises a computer vision engine to determine the presence of printing fluid sludge from the diagnostic image.

10. The device of claim 1 wherein the processor is to compare a color density across the diagnostic image and determine the presence of printing fluid sludge based on differences in color density across the diagnostic image.

11. A printing system, including:

a printing fluid delivery sub-system;

a light emitter to pass light through a fluid line associated with the fluid delivery sub-system, the fluid line comprising a printing fluid flowing therethrough;

an image sensor to capture, from the light passing through the fluid line, a diagnostic image including a portion of the fluid line and the printing fluid; and a processor to determine a presence of printing fluid sludge based on performing an image processing operation on the diagnostic image.

12. The printing system of claim 11 wherein the presence of printing fluid sludge is based on a detection of clogs in the diagnostic image.

13. The printing system of claim 11 wherein the image processing operation comprises comparing the diagnostic image to a baseline.

14. The printing system of claim 11 wherein the light emitter is to pass light through a plurality of fluid lines with a plurality of printing fluids, the image sensor is to capture a diagnostic image from the light passing through the plurality of fluid line including a portion of each of the plurality of fluid lines and their respective printing fluids and the processor is to determine a plurality of presence of printing fluid sludge based on performing an image processing operation for each of the plurality of printing fluids.

15. A fluid monitoring method comprising:

pass light, by a light source, through a printing fluid conductor comprising printing fluid;

acquire, by an image sensor and the light passing through the printing fluid conductor, a diagnostic image of the printing fluid in the printing fluid conductor;

determine, by a processor, a presence of printing fluid sludge based on the diagnostic image;

wherein the presence of printing fluid sludge is determined based on a comparison between the diagnostic image and a baseline accessible by the processor.

* * * * *